US010158498B2

(12) United States Patent
Brandman et al.

(10) Patent No.: US 10,158,498 B2
(45) Date of Patent: Dec. 18, 2018

(54) SYSTEM FOR BUILDING CONDITION SENSOR MONITORING AND CONTROL

(71) Applicant: HARTFORD FIRE INSURANCE COMPANY, Hartford, CT (US)

(72) Inventors: Michael Louis Brandman, Charlotte, NC (US); Julia M. Feldman, West Hartford, CT (US); Richard J. Marchetti, Plainville, CT (US); Steinar Ryen, Glastonbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 15/645,058

(22) Filed: Jul. 10, 2017

(65) Prior Publication Data
US 2017/0310498 A1  Oct. 26, 2017

Related U.S. Application Data

(63) Continuation of application No. 14/976,740, filed on Dec. 21, 2015, now Pat. No. 9,705,695.

(51) Int. Cl.
H04L 12/28 (2006.01)
G06Q 30/02 (2012.01)
G06Q 40/08 (2012.01)
G08B 17/10 (2006.01)
G08B 21/20 (2006.01)
G08B 19/00 (2006.01)
H04W 4/70 (2018.01)
B42D 15/00 (2006.01)

(52) U.S. Cl.
CPC ..... H04L 12/2803 (2013.01); G06Q 30/0207 (2013.01); G06Q 30/0283 (2013.01); G06Q 40/08 (2013.01); G08B 17/10 (2013.01); G08B 19/00 (2013.01); G08B 21/20 (2013.01); H04W 4/70 (2018.02); B42D 15/0033 (2013.01)

(58) Field of Classification Search
None
See application file for complete search history.

(56) References Cited

U.S. PATENT DOCUMENTS

| | | | |
|---|---|---|---|
| 7,711,584 B2 | 5/2010 | Helitzer et al. | |
| 8,271,303 B2 | 9/2012 | Helitzer et al. | |
| 8,359,211 B2 | 1/2013 | English et al. | |
| 8,490,006 B1 | 7/2013 | Reeser et al. | |
| 8,676,612 B2 | 3/2014 | Helitzer et al. | |
| 8,731,975 B2 | 5/2014 | English et al. | |
| 8,890,680 B2 | 11/2014 | Reeser et al. | |
| 9,049,168 B2 | 6/2015 | Jacob et al. | |
| 2005/0006109 A1* | 1/2005 | McSheffrey | A61N 1/39 169/75 |
| 2010/0205187 A1 | 8/2010 | Bertagna | |
| 2014/0114693 A1 | 4/2014 | Helitzer et al. | |
| 2014/0136242 A1 | 5/2014 | Weekes et al. | |
| 2014/0257876 A1 | 9/2014 | English et al. | |
| 2015/0100167 A1 | 4/2015 | Sloo et al. | |
| 2015/0249735 A1* | 9/2015 | Miller | H04W 4/70 455/420 |

* cited by examiner

Primary Examiner — Leon-Viet Nguyen
(74) Attorney, Agent, or Firm — Howard IP Law Group

(57) ABSTRACT

Apparatus and systems for providing home and building security and condition monitoring include a plurality of devices, including intelligent, multi-sensing, network-connected devices, that communicate dynamically with each other and a remote server.

16 Claims, 9 Drawing Sheets

| Sensor Type | Sensor Data | Use Case Data | Weighting |
|---|---|---|---|
| Theft deterrent system (entry/exit sensors, motion detectors, glass breakage sensors, video monitoring) | - Enrollment data; % of time system enabled vs disabled<br>- Occupancy data (Home vs Away status)<br>- Alarms with police dispatch | - Verification to maintain theft coverage discount<br>- Reduced risk due to presence at home<br>- Potential first notice of loss report | - High |
| 24x7 Remote Fire / Smoke / CO monitoring | - Enrollment data<br>- Alarm alert | - Verification of fire monitoring discount<br>- Potential first notice of loss report | - High |
| Leak detection system (notification and/or auto shutoff) | - Enrollment data<br>- Water flow threshold trip | - Verification of water non-weather coverage discount<br>- Potential first notice of loss report | - Medium |
| Temperature control monitoring (smart thermostats; smartphone integration) | - Enrollment data<br>- Average home temperature | - Verification of water non-weather coverage discount<br>- Reduced risk due to monitoring | - Medium |
| Utility monitoring (electricity, water usage) | - Average usage patterns/profile => occupancy data | - Reduced risk due to presence at home | - Low |
| Weather monitoring (GPS, wind, rain, pressure, temperature) | - Location, Date + Time, Local wind speed, rainfall, barometric pressure, external temperature | - Potential first notice of loss report<br>- Claim information verification<br>- CAT management | - Medium |

FIG. 6

SYSTEM FOR BUILDING CONDITION SENSOR MONITORING AND CONTROL

CROSS-REFERENCE TO RELATED APPLICATIONS

This application is a continuation application of co-pending U.S. patent application Ser. No. 14/976,740 filed on Dec. 21, 2015, now U.S. Pat. No. 9,705,695, the entire contents of which are incorporated herein by reference for all purposes.

BACKGROUND

Building and home automation or so called smart home/ building technology may include centralized control and monitoring of lighting, heating, ventilation, air conditioning, appliances, security, windows and doors and other systems, to provide improved safety, convenience, comfort, energy efficiency and security. The popularity of building and home automation has been increasing greatly in recent years due to the variety of sensors available and the much higher affordability and simplicity through smartphone and tablet access and connectivity.

Heating, ventilation and air conditioning (HVAC) systems can include temperature and humidity control with Internet-controlled thermostats that allow control of the building's heating and air conditioning systems via smartphone. The system may automatically open and close windows to cool or warm the house or building. Automation products can be used for as home security monitoring, control of lighting or can include very complex interactions with other systems. Control systems can be used to switch lights based on a time cycle, or arranged to automatically go out or one when a room or building is unoccupied. Systems can also be used to automatically control window shades and draperies to make best use of natural light and provide privacy at night.

A building and home automation system integrates various electronic and electrical devices in a structure with each other. Devices may be connected through a local wireless network to allow control by a personal computer, and may allow remote access from the internet or radio frequency based network via a smartphone or other portable mobile device. Through the integration of information technologies with the home or building environment, systems and appliances can communicate in an integrated manner which results in security, convenience, energy efficiency, and safety benefits to the occupant.

Accordingly, it would be desirable to access so called smart home and building systems to provide data for the provision of additional services to the building or home-owner. For example, third party entities can leverage data from connected home devices to assess and mitigate risk, increase pricing sophistication, and offer new products, all of which help drive operational efficiency and top-line growth.

SUMMARY

The present invention in some embodiments relates to a dynamic building control system having a plurality of sensor units for detecting one or more conditions associated with one or more building components, the system, comprising: a plurality of sensor units electrically connected to one or more building components, the sensor units comprising at least one or more of ultraviolet (UV), infrared (IR), multi-spectrum infrared (MSIR), and visual flame imaging, wherein the sensor units detect a plurality of condition states within certain regions of a building structure, wherein the sensor units generate electronic signals corresponding to a plurality of sensed condition states within a building structure; a wireless network in communication with the sensor units; and an electronic control center, wherein the control center receives the electronic signals over the wireless network and transmits data related to the electronic signals to a remote server system, the remote server system augmenting the received data with one or more third party auxiliary data sources, the remote server system further associating the augmented data with one or more building properties in order to modify one or more stored parameters associated with the building properties.

A sensor system having for detecting and mitigating one or more conditions associated with a connected home, the system, comprising a plurality of sensors coupled to one or more home components, wherein a plurality of the sensors sense one or more conditions within certain regions of the home; one or more control units electrically connected to the sensors, wherein at least one of control units generates an electronic signal corresponding to a condition of the home; and a control center connected to a remote server system, wherein the control center receives the electronic signal, and transmits data related to the electronic signal to a server system, the server system associating the received data with one or more indexed properties and applying a weighting factor to the received data for modifying a stored parameter associated with the one or more properties.

The present invention in some embodiments is a control system having a plurality of sensor units for monitoring a building structure, the system, comprising a plurality of sensor units electrically connected to one or more building components, wherein a plurality of the sensor units monitor one or more conditions within the building structure; one or more control units electrically connected to the sensor units, wherein at least one of control units generates an electronic signal corresponding to a condition state; and a control center connected to a remote server system, wherein the control center receives the electronic signal, and transmits data related to the electronic signal to a remote server system, the remote server system associating the received data with one or more building properties and applying a weighting factor to the data based on the respective sensor unit for the one or more building structures to modify a stored parameter associated with the one or more properties, the control center transmitting one or more control signals to one or more control units, the transmitted signal controlling one or more building components to mitigate a condition state associated with the building structure.

BRIEF DESCRIPTION OF THE DRAWINGS

A more detailed understanding may be had from the following description, given by way of example in conjunction with the accompanying drawings wherein:

FIG. 6 shows an exemplary database structure of an embodiment of the present invention;

DETAILED DESCRIPTION

Disclosed herein are apparatuses and computing systems, to centrally control and monitor operation of one or more connected building or home devices by issuing control requests and/or data requests within a wireless network system. The connected devices include components and sensor devices that comprise parts or units of building and home structures including various electromechanical devices that may be centrally controlled, such as electronic and electro-mechanical devices for home or building automation. The system communicates with the connected devices via a network and using appropriate protocol(s), and may be accessed remotely or locally. The system helps improve conditions and states within the home or building and assists with the provision of ancillary services related to the home or building.

Figure 1:
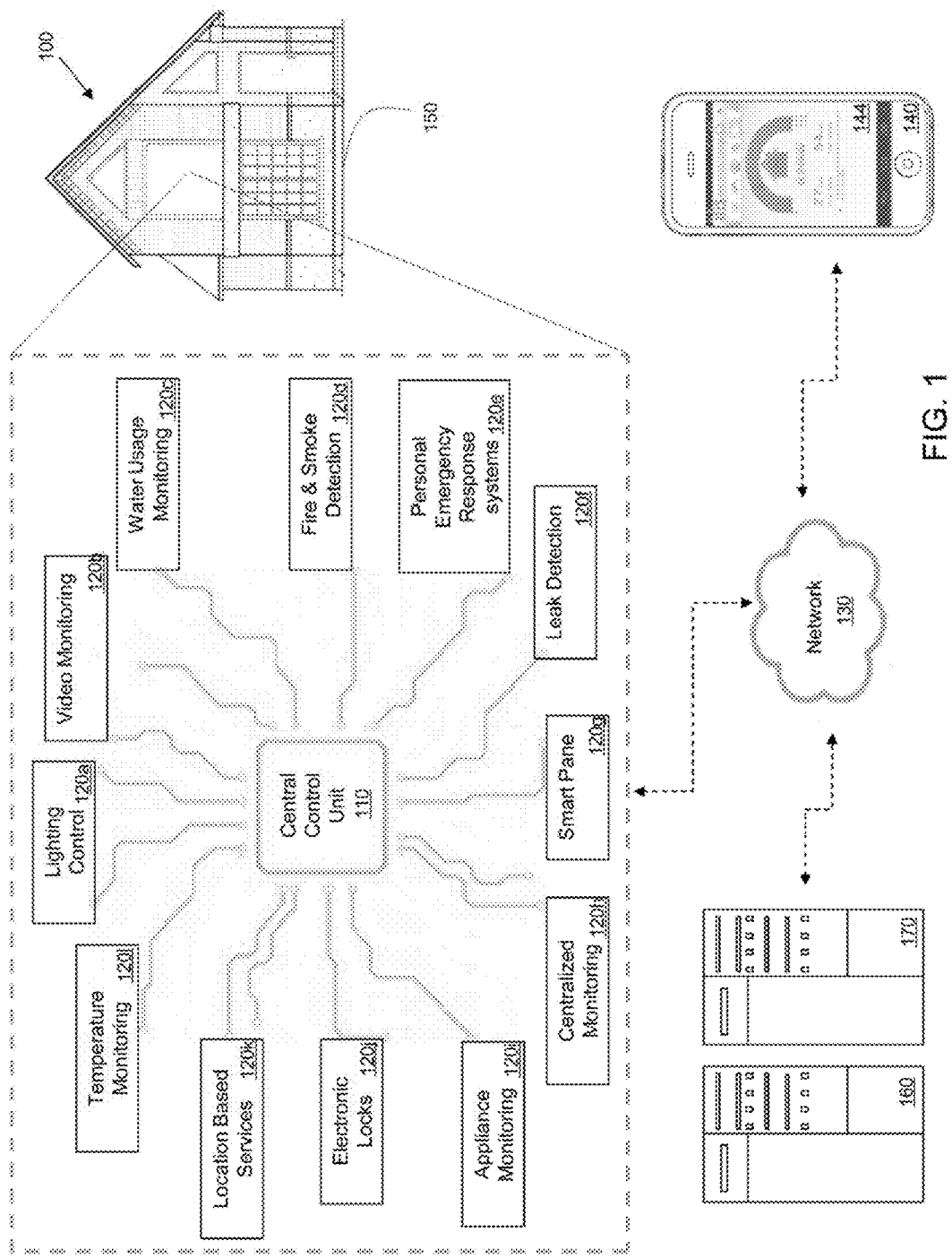
FIG. 1 shows an exemplary system architecture of the present invention.

Referring to FIG. 1, a sensor system 100 of the present invention typically includes a central controller device or unit 110 that connects multiple networked devices or modules 120a-l. Central control unit 110 communicates via a network 130 to remote user device 140 that is associated with a home or building structure 150. Central control unit 110 may be installed at a stationary location such as a home, place of work, or other location and may include basic processing, computing, control and storage functionalities including location capabilities and wireless communication capabilities to enable the central control unit 110 to communicate with one or more third party central monitoring systems 160, 170. Wireless communication capabilities may be any appropriate communication capabilities as will be apparent to one of skill in the art upon reading the present disclosure, including an RF transceiver and/or other wireless communication capabilities, such as wireless local area networks (WLAN) or cellular communication. The central control unit may also include wired as well as wireless communication capabilities for local area network, wide area network and other network communications implementing Internet Protocol and Ethernet as well as other communication technologies.

The remote user device 140 is configured to connect to central controller device 110 through network 130. The remote user device 140 may include a touch-sensitive touch screen 144 that provides an input interface and an output interface between the device and a user. Touch screen 144 displays visual output to the user where the output may include graphics, text, icons, video, and any combination thereof. The networked devices 120a-1, and the central controller device 110 may be physically located in or around the vicinity of a building or home 150.

System 100 via central control unit 110 enables the remote user devices 140 to access information and data maintained by the system 100 for the various networked devices 120a-1. Networked devices 120a-1 may include various sensors, modules and mechanisms including: a lighting control 120a, video monitoring 120b, water usage monitoring 120c, fire and smoke detection 120d, personal emergency response systems 120e, leak detection 120f, smart panels 120g, centralized monitoring 120h, appliance monitoring 120i, electronic locks, 120j, locations based services 120k and temperature monitoring 120l. System 100 enables the user to maintain and enforce individual preferences associated with one or more of components or modules including lighting control 120a, video monitoring 120b, water usage monitoring 120c, fire and smoke detection 120d, personal emergency response systems 120e, leak detection 120f, smart panels 120g, centralized monitoring 120h, appliance monitoring 120i, electronic locks, 120j, locations based services 120k and temperature monitoring 120l.

Devices 120a-1 and the central controller unit 110 typically are located in a physical place that enables the client devices 120a-1 to interact and communicate with one another. In one implementation, for example, devices 120a-1 may be physically located in a personal residence such as a single-family dwelling, a house, a townhouse, an apartment, or a condominium as well as a commercial building or factory. Devices 120a-1 may include one or more portable computing devices that may be taken outside of the structure and still remain connected to the central control unit 110 located within the structure through network 130.

Devices 120a-1 may include one or more sensor based computing devices, one or more special-purpose computers e.g., devices specifically programmed to communicate with the central control unit 110, or a combination of one or more sensor based computing devices and one or more special-purpose computers. Other examples of devices include a workstation, a server, an appliance e.g., a refrigerator, a microwave, and an oven, an intelligent household device e.g., a thermostat, a security system, an HVAC system, and an audio system, a device, a component, other physical or virtual equipment, or some combination of these elements capable of responding to and executing instructions within the system architecture shown in FIG. 1.

Referring still to FIG. 1, central control unit 110 may include a specialized computer having an internal or external storage for storing data and programs such as an operating system and one or more application programs. Examples of application programs include authoring applications capable of generating documents or other electronic content; client applications capable of communicating with other computer users, accessing various computer resources, and viewing, creating, or otherwise manipulating electronic content; and browser applications capable of rendering standard Internet content. In some embodiments, central control functions may be partially or wholly integrated with mobile device 140 such as control via an app that may integrate with central control unit 110.

Central control unit 110 also includes a central processing unit for executing instructions in response to commands from a client controller. In one implementation, the central control unit 110 includes one or more of the application programs installed on the internal or external storage of the general-purpose computer. In another implementation, the client controller includes application programs externally stored in and executed by one or more devices external to the computer. Central control unit 110 may be in communication with one or more third party central monitoring systems 160, 170 to enable data access and sharing related to one or more of the lighting control 120a, video monitoring 120b, water usage monitoring 120c, fire and smoke detection 120d, personal emergency response systems 120e, leak detection 120f, smart panels 120g, centralized monitoring 120*h*, appliance monitoring 120*i*, electronic locks, 120*j*, locations based services 120*k* and temperature monitoring 120*l*. Data related to one or more the lighting control 120*a*, video monitoring 120*b*, water usage monitoring 120*c*, fire and smoke detection 120*d*, personal emergency response systems 120*e*, leak detection 120*f*, smart panels 120*g*, centralized monitoring 120*h*, appliance monitoring 120*i*, electronic locks, 120*j*, locations based services 120*k* and temperature monitoring 120*l* may be utilized by a third party entity to determine a condition or state of the building or home 150 and such data may be used to improve conditions such as safety, security, temperature and environmental and physical conditions of the home or building.

Figure 2:
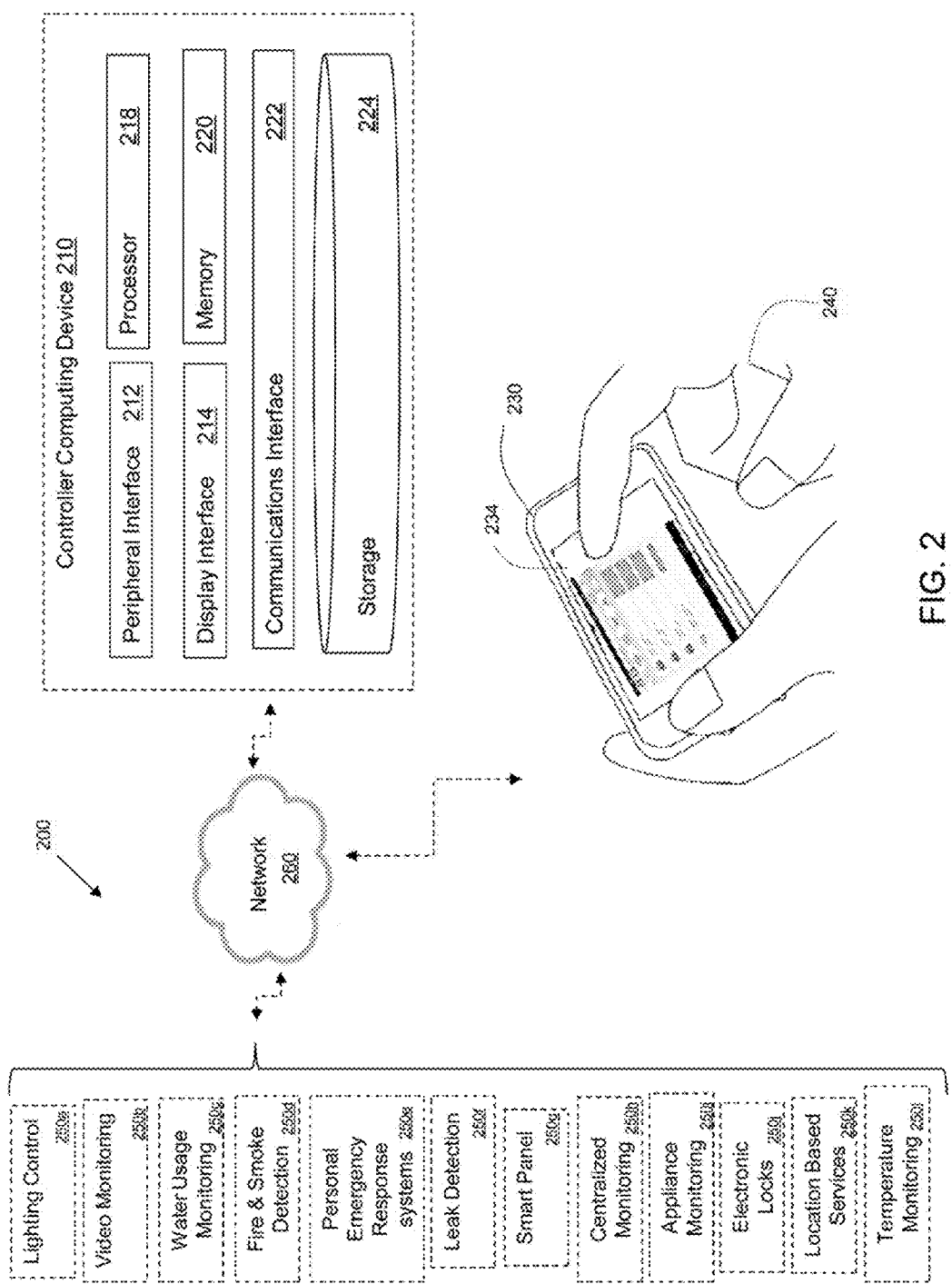
FIG. 2 shows an exemplary system that may be used for the management and analysis of sensor data.

FIG. 2 shows an example system architecture 200 that may be used for sensor control and analysis for one or more building structures. FIG. 2 shows an example computing device 210 that may be used to implement features describe above for managing building and risk data in accordance with embodiments of the present invention. Computing device 210 may be integrated as part of remote computing device 230 in some embodiments.

Referring still to FIG. 2, the computing device 210 may include a peripheral device interface 212, a display device interface 214, a navigation component 216, a processor 218, a memory device 220, a communication interface 222 and a data storage 224. In operation, computing device 210 is configured to receive and transmit a number of data flows via communications interface 222 including, for example, image, sound and/or video data such as from devices and sensors such as a lighting control 250*a*, video monitoring 250*b*, water usage monitoring 250*c*, fire and smoke detection 250*d*, personal emergency response systems 250*e*, leak detection 250*f*, smart panels 250*g*, centralized monitoring 250*h*, appliance monitoring 250*i*, electronic locks, 250*j*, locations based services 250*k* and temperature monitoring 250*l*.

The peripheral device interface 212 may be an interface configured to communicate with one or more peripheral devices such as a variety of sensors, device, cameras and modules. Peripheral devices may include a lighting control 250*a*, video monitoring 250*b*, water usage monitoring 250*c*, fire and smoke detection 250*d*, personal emergency response systems 250*e*, leak detection 250*f*, smart panels 250*g*, centralized monitoring 250*h*, appliance monitoring 250*i*, electronic locks, 250*j*, locations based services 250*k* and temperature monitoring 250*l* that are configured to provide safety, security, environmental and other data to controller computing device 210.

The peripheral device interface 212 may operate using a technology such as Universal Serial Bus (USB), PS/2, Bluetooth, infrared, firewire, serial port, parallel port, and/or other appropriate technology. Additionally, the peripheral device interface 212 may, for example, receive input data from an input device such as a keyboard, a mouse, a trackball, a touch screen, a touch pad, a stylus pad, and/or other device. Alternatively or additionally, the peripheral device interface 212 may communicate output data to a printer that is attached to the computing device 210 via the peripheral device interface 212.

The display device interface 214 may be an interface configured to communicate data to display device 234. The display device 234 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 214 may operate using technology such as Video Graphics Array (VGA), Super VGA (S-VGA), Digital Visual Interface (DVI), High-Definition Multimedia Interface (HDMI), or other appropriate technology. The display device interface 214 may communicate display data from the processor 218 to the display device 234 for display by the display device 234. As shown in FIG. 2, the display device 234 may be external to the computing device 210, and coupled to the computing device 210 via the display device interface 214.

The memory device 220 of FIG. 1 may be or include a device such as a Dynamic Random Access Memory (D-RAM), Static RAM (S-RAM), or other RAM or a flash memory. The storage device 224 may be or include a hard disk, a magneto-optical medium, an optical medium such as a CD-ROM, a digital versatile disk (DVDs), or Blu-Ray disc (BD), or other type of device for electronic data storage.

The communication interface 222 may be, for example, a communications port, a wired transceiver, a wireless transceiver, and/or a network card. The communication interface 222 may be capable of communicating using technologies such as Ethernet, fiber optics, microwave, xDSL (Digital Subscriber Line), Wireless Local Area Network (WLAN) technology, wireless cellular technology, and/or any other appropriate technology.

Remote device 230 may be configured to receive data from and control the operation of peripheral devices including lighting control 250*a*, video monitoring 250*b*, water usage monitoring 250*c*, fire and smoke detection 250*d*, personal emergency response systems 250*e*, leak detection 250*f*, smart panels 250*g*, centralized monitoring 250*h*, appliance monitoring 250*i*, electronic locks, 250*j*, locations based services 250*k* and temperature monitoring 250*l*. Control may be performed via an app executing on device 230 based on instructions from user 240.

Control instructions and data are generally transmitted to and from remote control device 230 to peripheral devices lighting control 250*a*, video monitoring 250*b*, water usage monitoring 250*c*, fire and smoke detection 250*d*, personal emergency response systems 250*e*, leak detection 250*f*, smart panels 250*g*, centralized monitoring 250*h*, appliance monitoring 250*i*, electronic locks, 250*j*, locations based services 250*k* and temperature monitoring 250*l* through a wireless network 260.

Wireless network 260 may be implemented using any wireless data transmission including but not limited to TDMA, GSM, CDPD, GPRS, EDGE, and UMTS. In a preferred embodiment, a data communications link layer is implemented using one of these technologies, a data communications network layer is implemented with the Internet Protocol ("IP"), and a data communications transmission layer is implemented using the Transmission Control Protocol ("TCP"). In such systems, information between the devices and remote control device 230 are transmitted using an application-level protocol such as, for example, the HyperText Transmission Protocol ("HTTP"), the Wireless Application Protocol ("WAP"), the Handheld Device Transmission Protocol ("HDTP"), or any other data communications protocol as will occur to those of skill in the art.

As used herein, "TDMA" stands for Time Division Multiple Access, a technology for delivering digital wireless service using time-division multiplexing. "GSM" stands for Global System for Mobile Communications, a digital cellular standard in Europe and Asia. "CDPD" stands for Cellular Digital Packet Data, a data transmission technology developed for use on cellular phone frequencies. "GPRS" stands for General Packet Radio Service, a standard for wireless data communications that supports a wide range of speeds, is an efficient use of limited bandwidth and is particularly suited for sending and receiving small bursts of data, such as e-mail and Web browsing, as well as large volumes of data. "EDGE" stands for Enhanced Data Rates for GSM Evolution, a standard for wireless data communications supporting high data transfer rates. "UMTS" stands for Universal Mobile Telecommunication System, a standard for wireless data communications supporting high data transfer rates and also referred to as W-CDMA for Wideband Code Division Multiple Access.

Alternatively or additionally, an instance of the computing device 210 may be configured to perform any feature or any combination of features described herein. In such an instance, the memory device 220 and/or the storage device 224 may store instructions which, when executed by the processor 218, cause the processor 218 to perform any feature or any combination of features described herein. In such an instance, the processor 218 may perform the feature or combination of features in conjunction with peripheral device interface 212, display interface 214, memory 220, communication interface 222, and/or data storage device 224.

Although FIG. 2 shows that the computing device 210 includes a single processor 218, single memory device 220, single communication interface 222, single peripheral device interface 212, single display device interface 214, and single storage device 224, the computing device may include multiples of each or any combination of these components and may be configured to perform analogous functionality to that described above.

Each or any combination of the components/modules shown in FIG. 2 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 2, these modules may perform functionality described later herein.

Figure 3:
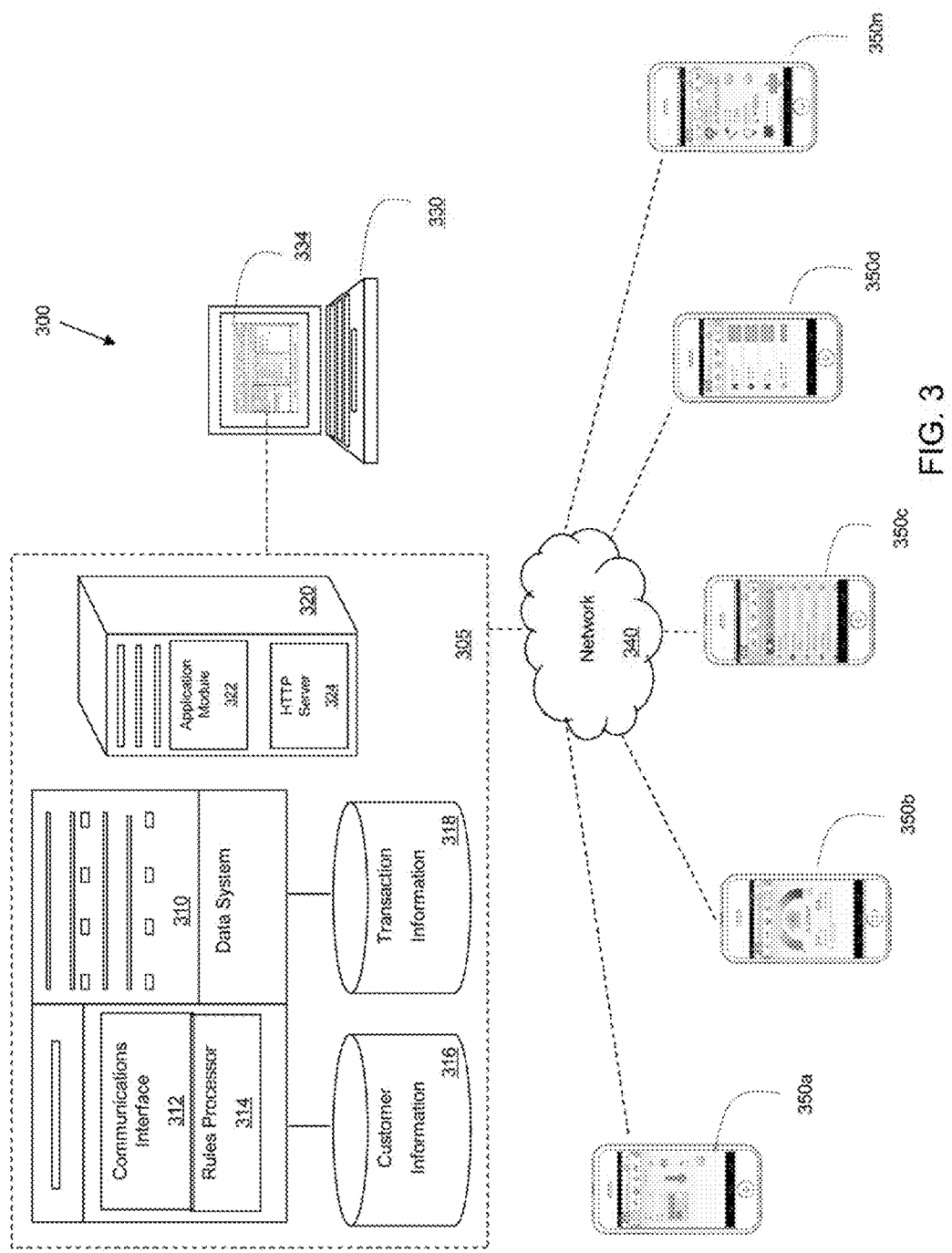
FIG. 3 shows another exemplary system of the present invention.

FIG. 3 shows an example system architecture 300 that may be used for risk management and loss control using sensor based data. The example architecture 300 includes a computer system 305 including a data system 310, a web system 320 and a business terminal 330, a network 340, and a plurality of remote handheld computing devices 350a-n. Data system 310 may include a communications interface 312, a rules processor 314, a customer database 316 and a transaction database 318.

In one embodiment, business rules processor 314 may include one or more rules and/or predictive models. The rules processor 314 may use the one or more rules and/or predictive models to evaluate certain internet or web data as well as customer data to determine, for example, if a certain event of condition exists at a building or home. Generally, a predictive model takes into account a plurality of parameters, and in embodiments may take into account any number of parameters, such as up to 10 parameters, up to 100 parameters or more parameters. The predictive model may include one or more of neural networks, Bayesian networks (such as Hidden Markov models), expert systems, decision trees, collections of decision trees, support vector machines, or other systems known in the art for addressing problems with large numbers of variables. Preferably, the predictive model is trained on prior data and outcomes. The specific data and outcomes analyzed vary depending on the desired functionality of the particular predictive model. The particular data parameters selected for analysis in the training process are determined by using regression analysis and/or other statistical techniques known in the art for identifying relevant variables in multivariable systems.

In other embodiments, one or more decision trees, equations or tables may be included with and executed by rules processor 314. Decision trees may include decisions relating to identified terms and phrases and equivalent terms and phrases, in accordance with text based analysis principles.

In one embodiment, data system 310, terminal 330, and remote device 350a-n are in communication via a network 340. Data system 310 shown in FIG. 3 is an embodiment of a system that might be implemented solely within a single location or be an aggregation of one or more other subsystems including one or more partner, third party administrator and/or vendor subsystems to allow communications and data transfer between the company and representatives, investigators, adjusters, customers, and agents. Data transferred through network 340 to system 310 may pass through one or more firewalls or other security type controls implemented within web system 320 and/or in standalone devices. The firewall allows access to network 340 only through predetermined conditions/ports. In another embodiment, the firewall restricts the Internet IP addresses that may access web system 320.

Referring to FIG. 3 still, rules processor 314 may include one or more business rules and one or more predictive models, decision trees, equations and/or tables, in conjunction with one or more software modules or objects and one or more specific-purpose processor elements, to perform the processing required by embodiments of the present invention such as for evaluating data to evaluate and mitigate risk with the building or home based on information from the plurality of sensors and additional third party information. For example, security system sensor data may be coupled with third party alarm system monitoring data to determine whether one or more conditions or parameters associated with the home or building should be modified.

The insureds' information database 316 may store information, data and documents that relate to customers such as home, business and/or automobile related policy information as well as location information. Transaction information database 318 may store information, data and documents from user devices 350a-n and remote devices 350a-n. Insureds' information database 316 and transaction information database 318 may be spread across one or more computer-readable storage media, and may be or include one or more relational databases, hierarchical databases, object-oriented databases, one or more flat files, one or more spreadsheets, and/or one or more structured files. Insureds' information database 316 and transaction information database 318 may be managed by one or more database management systems (not depicted), which may be based on a technology such as Microsoft SQL Server, MySQL, Oracle Relational Database Management System (RDBMS), PostgreSQL, a NoSQL database technology, and/or any other appropriate technology. Communication between the data system 310 and the other elements in the example architecture 300 of FIG. 3 may be performed via the communications interface module 312.

Referring still to FIG. 3, web system 320 may provide a web interface that may be accessed directly by a user such as an insured, a claims representative, an adjuster and other third party entity employing user devices 332a-n to communicate and interact with a company representative employing terminal 330. In certain embodiments, terminal 330 can include, but are not limited to cellular telephones, other wireless communication devices, personal digital assistants, pagers, laptop computers, tablet computers, smartphones, other mobile display devices, or combinations thereof. In embodiments of the present invention, terminal 330 may communicate with the web site system 320 that may be operated by or under the control of an entity or other third party entity such as an outsourced type entity or third party administrator type entity.

The web site system 320 may include a web application module 322 and a HyperText Transfer Protocol (HTTP) server module 324. The web application module 322 may generate the web pages that make up the web site and that are communicated by the HTTP server module 324. Web application module 322 may be implemented in and/or based on a technology such as Active Server Pages (ASP), PHP: Hypertext Preprocessor (PHP), Python/Zope, Ruby, any server-side scripting language, and/or any other appropriate technology.

The HTTP server module 324 may implement the HTTP protocol, and may communicate HyperText Markup Language (HTML) pages and related data from the web site to/from client devices terminal 334, user device 350c, using HTTP. The HTTP server module 324 may be, for example, a Sun-ONE Web Server, an Apache HTTP server, a Microsoft Internet Information Services (IIS) server, and/or may be based on any other appropriate HTTP server technology. The web site system 320 may also include one or more additional components or modules (not depicted), such as one or more switches, load balancers, firewall devices, routers, and devices that handle power backup and data redundancy.

Referring still to FIG. 3, terminal 330 may include a web browser module 334, which may communicate data related to the web site to/from the HTTP server module 324 and the web application module 322 in the web site system 320. The web browser module 334 may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module 334 may implement Rich Internet Application (RIA) and/or multimedia technologies such as Adobe Flash, Microsoft Silverlight, and/or other technologies. The web browser module 334 may implement RIA and/or multimedia technologies using one or web browser plug-in modules (such as, for example, an Adobe Flash or Microsoft Silverlight plugin), and/or using one or more sub-modules within the web browser module 334 itself.

The example architecture 300 of FIG. 3 may also include one or more wired and/or wireless networks via which communications between the elements and components shown in the example architecture 300 may take place. The networks may be private or public networks, cloud or shared networks and/or may include the Internet.

Figure 4:
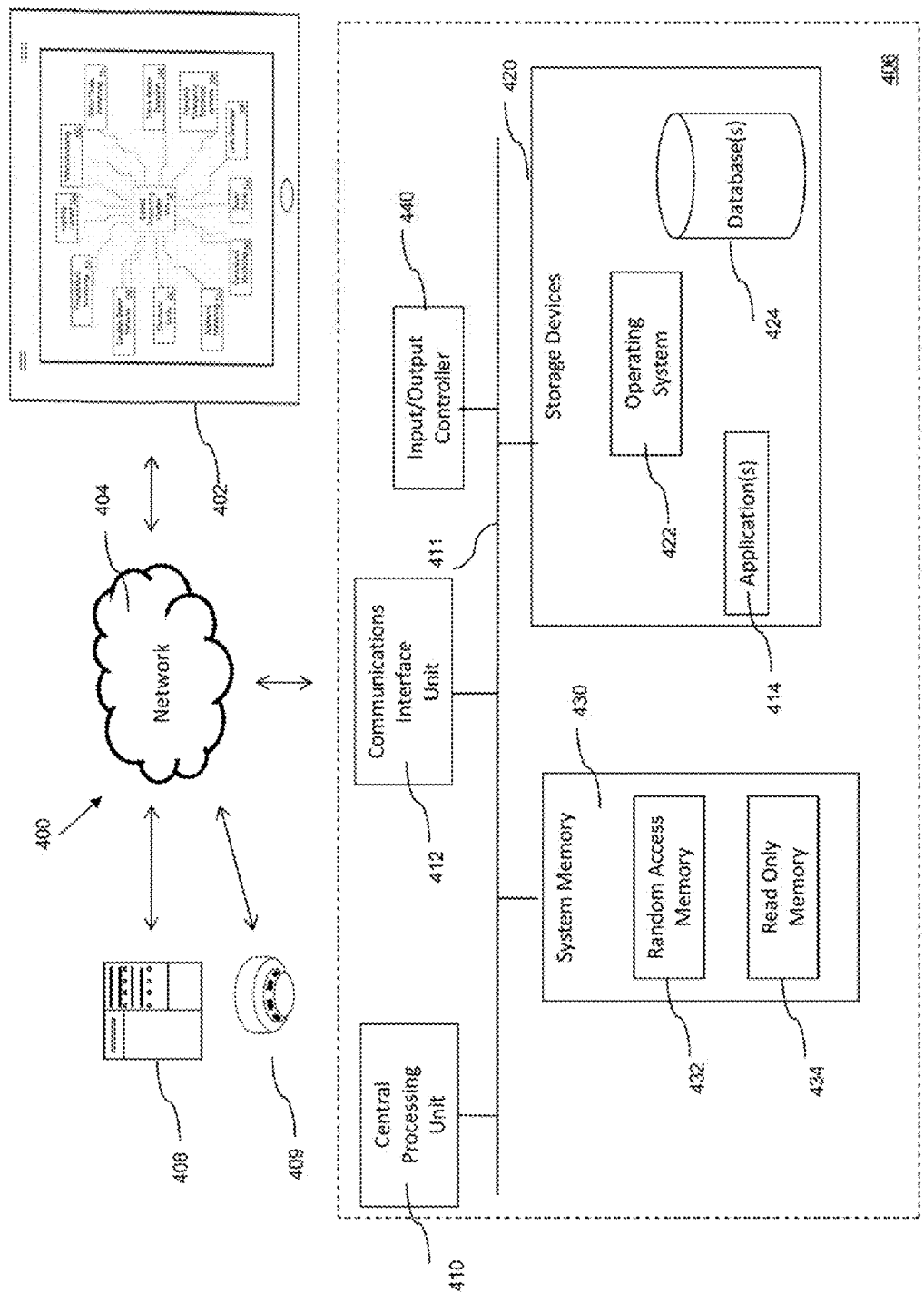
FIG. 4 shows another exemplary system embodiment of the present invention.

Referring to FIG. 4, an exemplary computer system 400 for use in an implementation of the invention will now be described. Computer system 400 may be configured to perform pricing, risk management, loss control services and claims evaluation and management for one or more companies and their associated agents, personnel, customers and staff using devices 402. System 400 may include device 402, which may be a company agent or vendor terminal or device, a network 404, a processing and data system 406 and one or more third party servers 408 and one or more sensors 409. In embodiments of the present invention, processing and data system 406 is responsible for the processing of home or building data to adjust pricing and mitigate risk associated with the home or building. Third party servers may be administered by third party web operators or social media server operators. In processing and data system 406, a central processing unit or processor 410 executes instructions contained in programs such as policy management application program 414, stored in storage devices 420. Processor 410 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 420 may include suitable media, such as optical or magnetic disks, fixed disks with magnetic storage (hard drives), tapes accessed by tape drives, and other storage media. Processor 410 communicates, such as through bus 411 and/or other data channels, with communications interface unit 412, storage devices 420, system memory 430, and input/output controller 440. System memory 430 may further include non-transitory computer-readable media such as a random access memory 432 and a read only memory 434. Random access memory 432 may store instructions in the form of computer code provided by application 414 to implement embodiments of the present invention. One or more computer programs may be stored in memory, or computer usable media, such as storage devices 420 and random access memory 432, in the form of computer readable program code adapted to be executed by at least one processor, such as a central processing unit 410. The one or more computer programs may include instructions for performing steps of methods of embodiments of the invention described herein. System 400 further includes an input/output controller 440 that may communicate with processor 410 to receive data from user inputs such as pointing devices, touch screens, and audio inputs, and may provide data to outputs, such as data to video drivers for formatting on displays, and data to audio devices.

Storage devices 420 are configured to exchange data with processor 410, and may store programs containing processor-executable instructions, and values of variables for use by such programs. Processor 410 is configured to access data from storage devices 420, which may include connecting to storage devices 420 and obtaining data or reading data from the storage devices, or placing data into the storage devices. Storage devices 420 may include local and network accessible mass storage devices. Storage devices 420 may include media for storing operating system 422 and mass storage devices such as storage 424 for storing data related to sensor data, including sensor activity information, GIS data and other location based data, policy data including location data, such as physical address data, and address data such as telephone number data and e-mail address data, predictive model data, and property and owner related data.

Communications interface unit 412 may communicate via network 404 with other computer systems such as third party servers 408 as well as other internal and external servers, computer systems of remote sources of data, and with systems for implementing instructions output by processor 410. Processing and data system 406 may also be configured in a distributed architecture, wherein databases, data storage devices and processors are housed in separate units or locations. The servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SASTM, ATP, Bluetooth, GSM and TCP/IP. Network 404 may be or include wired or wireless local area networks and wide area networks, and over communications between networks, including over the Internet.

One or more public cloud, private cloud, hybrid cloud and cloud-like networks may also be implemented, for example, to handle and conduct processing of one or more transactions or processing of embodiments of the present invention. Cloud based computing may be used herein to handle any one or more of the application, storage and connectivity requirements of embodiments of the present invention. For example one or more private clouds may be implemented to store, process and otherwise handle sensor data and pricing data of embodiments of the present invention. Furthermore, any suitable data and communication protocols may be employed to accomplish the teachings of embodiments of the present invention.

Figure 5:
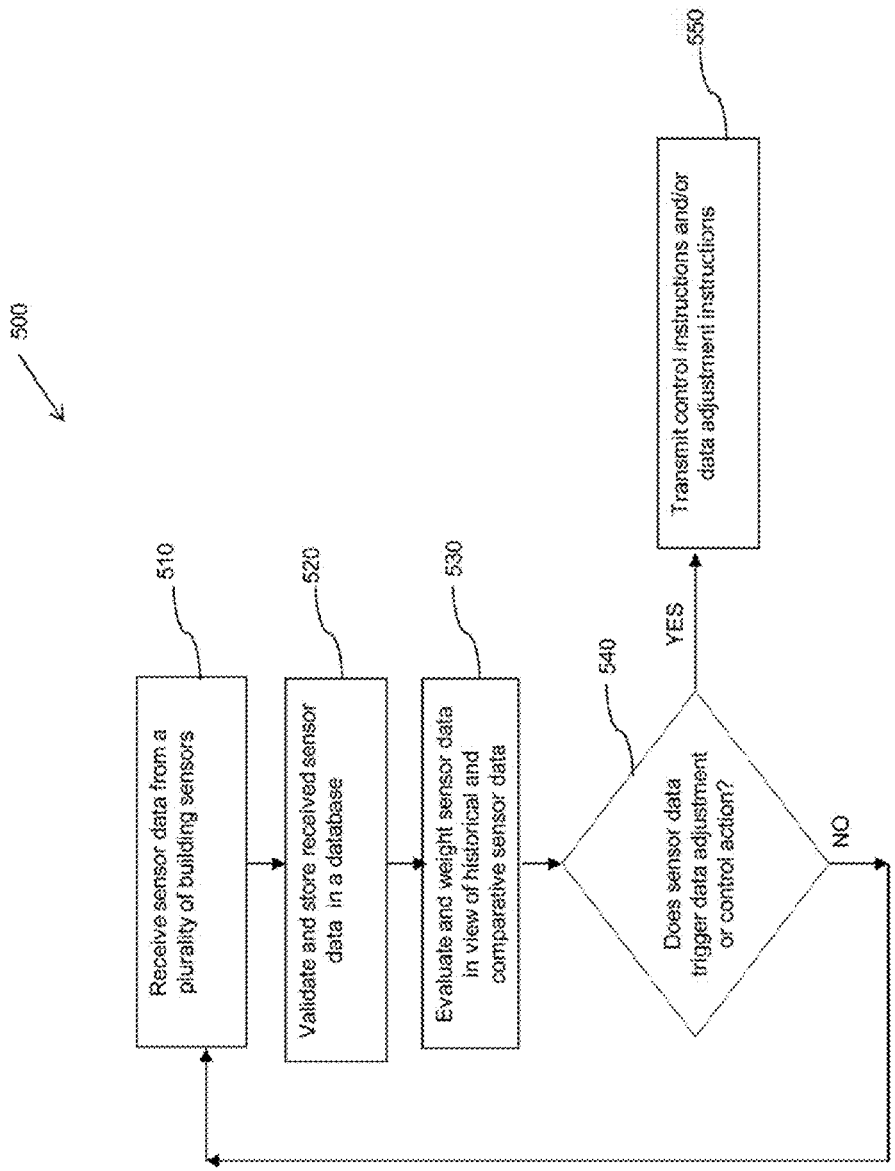
FIG. 5 shows a process flow diagram of an exemplary computer implemented method in accordance with the present invention.

FIG. 5 illustrates an exemplary computerized method 500 of the present invention. In one embodiment, the method 500 includes the step of receiving sensor data from a plurality of building sensors, step 510. The method further continues with validating and storing sensor data in a database, step 520. The method continues with evaluating and weighting sensor data in view of historical and comparative sensor data, step 530. The system determines if the sensor data triggers certain data adjustments or control actions, step 540. If so, the system may transmit control instructions and/or data adjustment instructions, step 550. For example, if the data includes an indication of a deviation, violation or a breach of a threshold, information may be sent to a remote server to perform a pricing adjustment or to a control unit to initiate an action such as the manipulation of a building component parameter.

In embodiments, sensor data may be employed for loss control data processing to identify potentially hazardous conditions, services and instructions may be issued to help mitigate the conditions.

FIG. 6 shows an exemplary database structure 600 that may be implemented as a database as described herein. Database structure 600 may be implemented as an analytic, management, operational, flat-file, rational, or hierarchical database in a standalone, network, or distributed configuration or as part of a database management system (DBMS) that interact with the user, other applications, and the database itself to capture and analyze data for use in loss control and preemptive claim management such as MySQL, MariaDB, PostgreSQL, SQLite, Microsoft SQL Server, Oracle, SAP, dBASE, FoxPro, IBM DB2, LibreOffice Base and FileMaker Pro. Database 600 includes a number of database column fields 610, 620, 630, and 650 and a number of database rows 660, 662, 664, 666, 668 and 669. Column fields 610, 620, 630, and 640 may correspond to one or more fields such as Sensor type 610, Sensor Data 620, Use Case Data 630, and Weighting Data 640. In database 600, a certain sensor type 670 may be associated with certain sensor data, along with certain use case data 674, and weighting data 676. Weighting data may be a relative weighting, a numerical factor or other weighting methodology to indicate a measure related to the sensor type being used and the actual usage and applicability of the sensor and its usage. In some embodiments, certain sensors may be valued higher than other sensors and certain combinations of sensors alone or together may be valued differentially. Simply the presence of a sensor may have some weight, and additionally, the efficacy and use of the sensor may be weighted proportionally.

Figure 7:
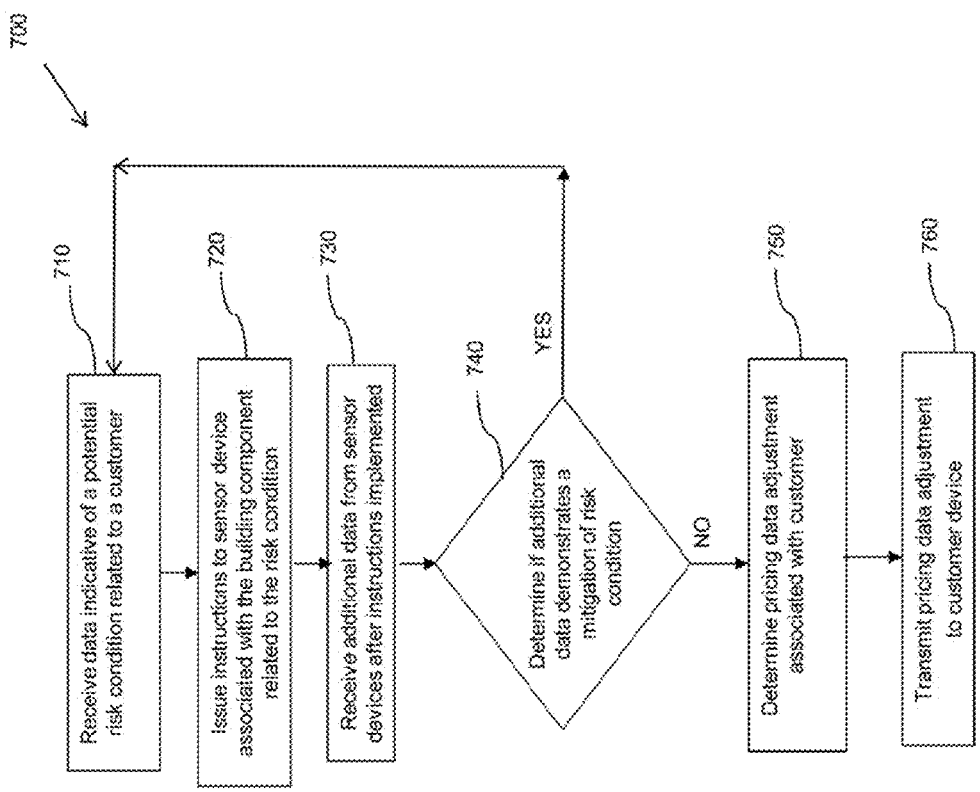
FIG. 7 shows another process flow diagram of an exemplary computer implemented method in accordance with the present invention.

FIG. 7 illustrates another exemplary computerized method 700 of the present invention. In one embodiment, the method 700 includes the step of receiving data indicative of a potential risk condition related to a customer, step 710. The method further continues issuing instructions to sensor device associated with the building component related to the risk condition, step 720. The method continues with receiving additional data from sensor devices after instructions implemented, step 730. The system determines if the additional data demonstrates a mitigation of risk condition, step 740. If not, the system determines a pricing data adjustment associated with customer, step 750. The pricing data then is transmitted to the customer device, step 760.

Figure 8:
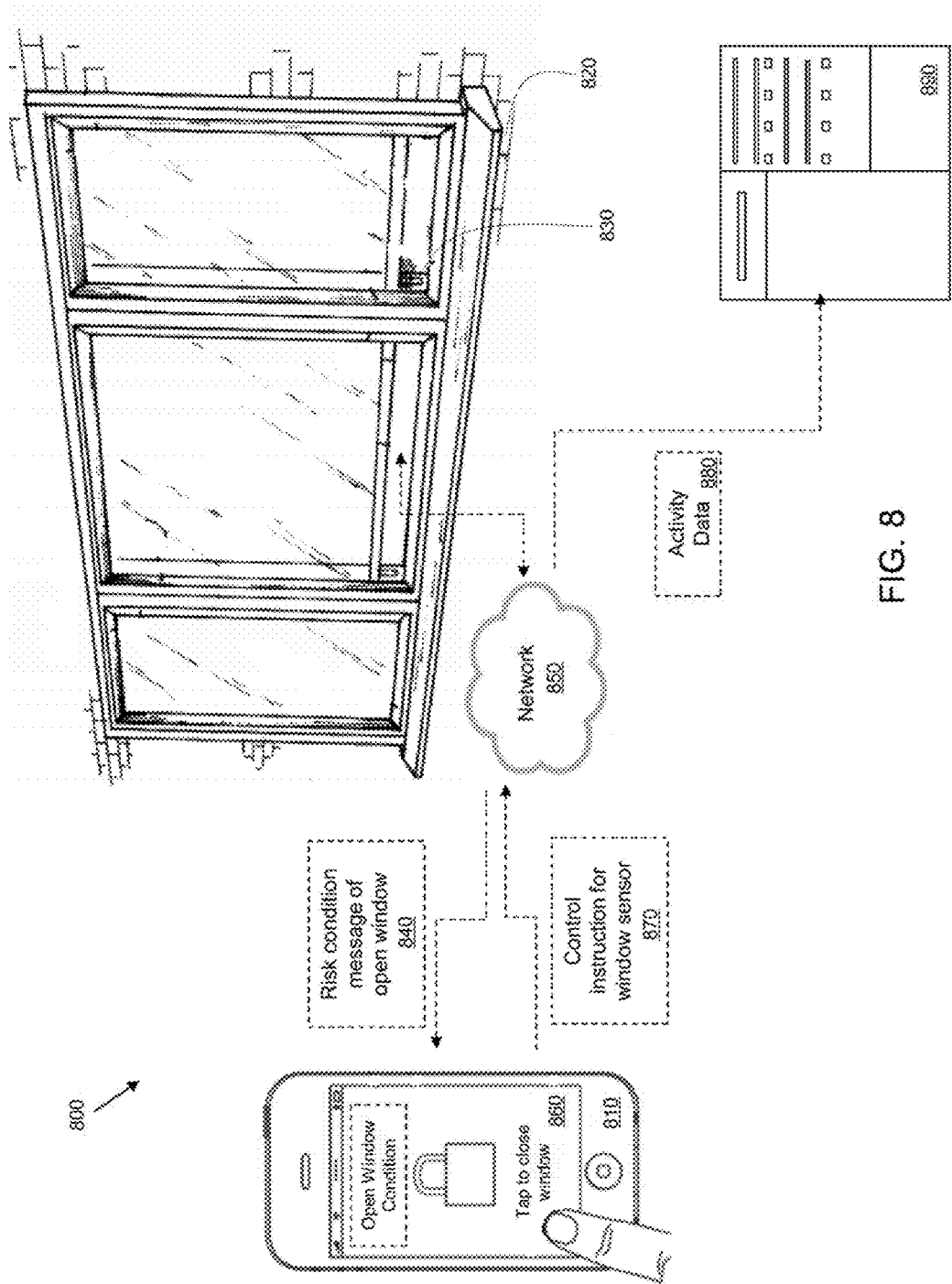
FIG. 8 shows another exemplary system of the present invention.

FIG. 8 illustrates an exemplary system implementation 800 of the present invention that includes a handheld computing device 810 that is enable to receive signals and data from a building component 820. Building component 820 includes one or more sensors 830 that provide information and data about the building component to handheld computing device 810. Risk conditions associated with the building component 820 may be transmitted as message data 840 via a network 850. A user of computing device 810 may view message data on a display 860 and may actuate display 860 to control building component 820 in response to the message data 840. Based on the user's commands on display 860, device 810 may transmit control instructions 870 to building component sensor 830 via network 850. Sensor 830 may be configured to respond to the command, such as via closing the window in this illustrative example, thereby mitigating risk from weather, intrusion, etc and thereby avoiding any rate increase associated with the risk. This activity or transaction data 880 related to the sensor activity and action is also sent to a remote server 890 for administration and management. The activity data 880 may be used to adjust factors such as pricing and discounts for the property related to the building component 820.

Figure 9:
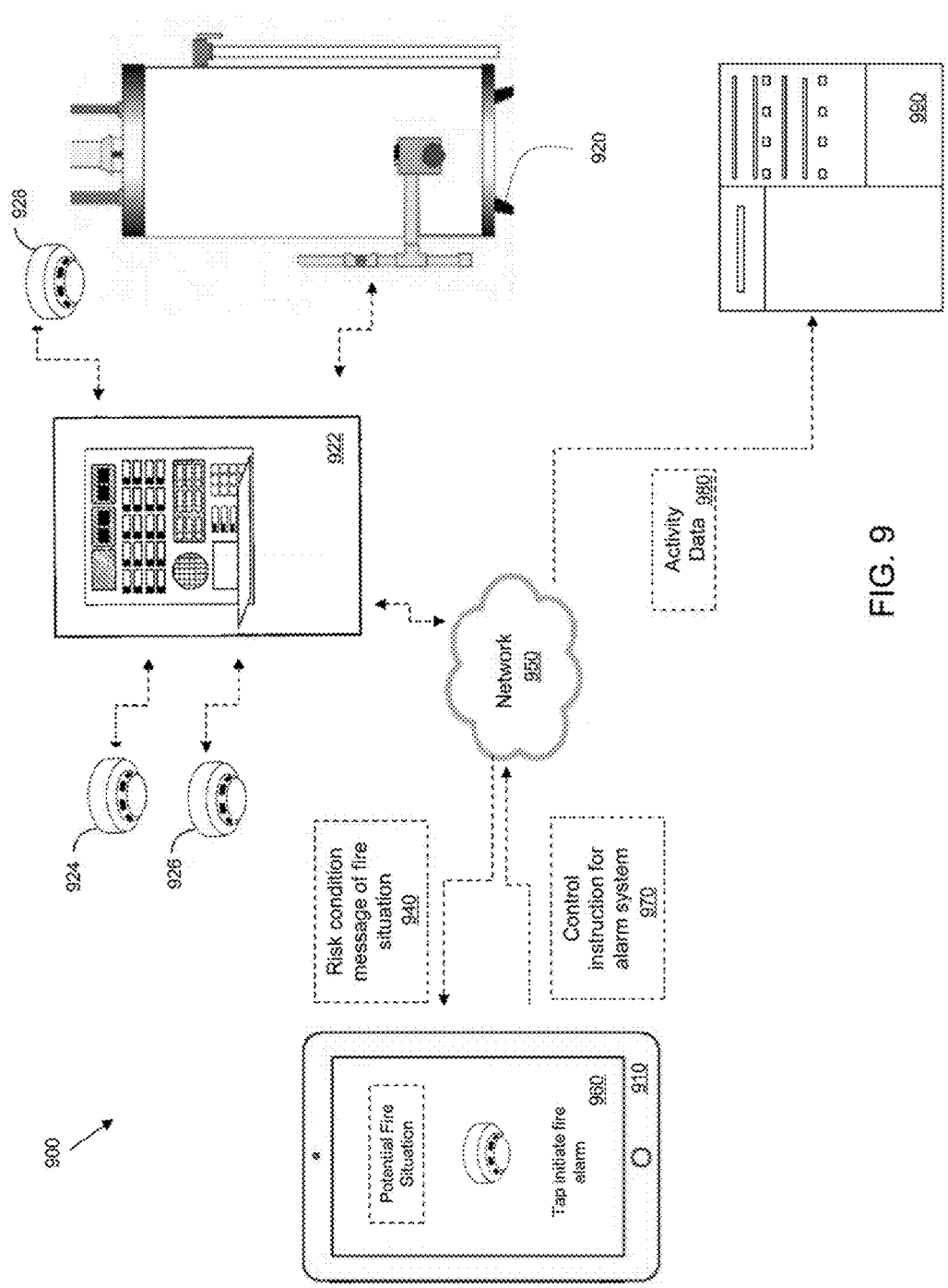
FIG. 9 shows another exemplary system of the present invention.

FIG. 9 illustrates another exemplary system implementation 900 of the present invention that includes a handheld tablet type computing device 910 that is enable to receive signals and data from a variety of building components and sensors 920, 922, 924, 926 and 928. Components and sensors 920, 922, 924, 926 and 928 provide information and data about an associated building or home to handheld computing device 910. One of the components such as component 922 may be configured as a central control unit in communication with a network 950. Risk conditions associated with the building or home may be transmitted as message data 940 via a network 950. A user of computing device 910 may view message data on a display 960 and may actuate display 960 to control or access additional information from one or more of sensors or components 920, 922, 924, 926 and 928 in response to the message data 940. Based on the user's commands on display 960, device 910 may transmit control instructions 970 to one or more of the components or sensors 920, 922, 924, 926 and 928 via network 950. One or more of the components or sensors 920, 922, 924, 926 and 928 may be configured to respond to the command thereby mitigating risk from fire, smoke, weather, etc. and thereby avoiding any additional risk increase associated with the risk. This activity or transaction data 980 related to the sensor activity and action is also sent to a remote server 990 for administration and management. The activity data 980 may be used to adjust factors such as pricing and discounts for the property related to the building component 920. Activity data may include whether a certain sensor such as a smoke detector or fire detector is active or inactive as well as an operating condition of a furnace or boiler or other appliance or device within a building or home.

In an embodiment, activity data related to a property may be used to determine adjustments and ancillary services for the property using the following equation:

$$\text{Adjustments} = \text{Type of Sensor} \times \text{Weighting of Sensor} \times \text{Frequency of Productive Use}$$

The determined data applicability score may be compared to a threshold value that may be set from historical and real time data related to the property and other similar properties. Responsive to the data applicability score being below the threshold value, no pricing adjustments may be made. Responsive to the data applicability score being at or above the threshold, the system proceeds to issuing instructions for adjustment or modification or pricing such as reducing or remove a discount or applying a surcharge. For example, if the theft deterrent system is rarely activated during crucial times such as in the evening, this may affect the pricing in a negative manner since the frequency of product use would be low. The sensor data may be augmented with auxiliary data from third party monitoring systems such as by third party alarm entities. Third party data may include use data, enrollment data, location data, etc. associated with a property. By way of further example, if the remote fire sensor and leak detection sensor remain active during a certain period, this may positively affect pricing as the frequency of productive use would be high. The activity data may also be used to alert one or more third party entities such as law enforcement, public services like fire departments and other entities that may provide coverage for the property.

Although the methods and features described above with reference to FIGS. 1-9 are described above as performed using the example architecture 100 of FIG. 1 and the exemplary system 200 of FIG. 2, the methods and features described above may be performed using any appropriate architecture and/or computing environment. Although features and elements are described above in particular combinations, each feature or element can be used alone or in any combination with or without the other features and elements. For example, each feature or element as described with reference to FIGS. 1-9 may be used alone without the other features and elements or in various combinations with or without other features and elements. Sub-elements of the methods and features described above with reference to FIGS. 1-8 may be performed in any arbitrary order (including concurrently), in any combination or sub-combination.

What is claimed is:

1. A dynamic building control system for detecting one or more conditions associated with one or more building regions of a building property, the system, comprising:
   a plurality of sensors configured to monitor the one or more building regions of the building property, wherein each of the plurality of sensors is configured to generate electronic signals corresponding to one or more sensed conditions of the one or more building regions;
   a plurality of electronic and electromechanical devices configured to control one or more building components;
   a wireless network in communication with the plurality of sensors and the plurality of electronic and electromechanical devices; and
   an electronic control center connected to a remote server system and a remote data system, wherein the electronic control center is configured to:
      receive, from the wireless network, the electronic signals corresponding to the one or more sensed conditions of the one or more building regions;
      transmit, via a communications interface device, to the remote server system, data related to the electronic signals;
      receive, via the communications interface device from the remote server system, instructions for controlling one or more of the plurality of electronic and electromechanical devices to mitigate a risk condition when the data related to the electronic signals indicates a presence of the risk condition corresponding to the one or more building regions;
      transmit, via the wireless network to the one or more of the plurality of electronic and electromechanical devices, the instructions to control the one or more of the plurality of electronic and electromechanical devices to mitigate the risk condition, wherein the one or more of the plurality of electronic and electromechanical devices are configured to implement the instructions;
      receive, after implementation of the instructions by the one or more of the plurality of electronic and electromechanical devices, additional electronic signals from the plurality of sensors corresponding to the one or more sensed conditions of the one or more building regions; and
      transmit, via the communications interface device to the remote server system, additional data related to the additional electronic signals;
      wherein the remote server system determines, based upon the additional data, whether the risk condition was mitigated by the implementation of the instructions; and responsive to a determination that the risk condition was not mitigated by the implementation of the instructions, modifies one or more stored parameters associated with the building property.

2. The system of claim 1, wherein the plurality of sensors comprise at least one of a fire detector, a smoke detector, a CO2 detector, a water leak detector, an appliance monitor, an electronic lock sensor, a temperature sensor, a video monitor, a water usage monitor, a security system monitor, a leak detection system, a furnace monitor, a boiler monitor, an entry/exit sensor, a motion detector, a glass breakage sensor, an ultraviolet (UV) sensor, an infrared (IR) sensor, a multispectrum infrared (MSIR) sensor, and a visual flame imaging sensor.

3. The system of claim 1, wherein the one of the plurality of sensors comprises one or more of a smoke detector, a fire detector, and a visual flame imaging sensor, wherein the risk condition comprises a potential fire, wherein the one or more of the plurality of electronic and electromechanical devices comprises a fire alarm, and wherein the instructions to control the one or more of the plurality of electronic and electromechanical devices to mitigate the risk condition comprises an instruction to control the fire alarm to initiate an alarm.

4. The system of claim 1, wherein the one of the plurality of sensors comprises a temperature sensor, wherein the risk condition comprises an open window detected based on temperature data sensed by the temperature sensor, wherein the one or more of the plurality of electronic and electromechanical devices comprises a window motor, and wherein the instructions to control the one or more of the plurality of electronic and electromechanical devices to mitigate the risk condition comprises an instruction to control the window motor to close the open window.

5. The system of claim 1, wherein the electronic control center is further configured to continually receive the additional electronic signals from the plurality of sensors and transmit the additional data relating to the additional electronic signals to the remote server system via the communications interface device, and wherein the remote server system is further configured to determine a usage of one of the plurality of sensors based upon the additional data and modify the one or more stored parameters associated with the building property based upon the determined usage.

6. The system of claim 1, wherein the remote server system is further configured to receive auxiliary data indicative of current enrollment in monitoring services provided by one or more third party monitoring services currently monitoring one or more of the plurality of sensors, and wherein the remote server system is further configured to modify the one or more stored parameters associated with the building property based upon the auxiliary data.

7. The system of claim 1, wherein the remote server system is further configured to determine, responsive to the data related to the electronic signals indicating the presence of the risk condition corresponding to the one or more building regions, whether a first notice of loss has been received.

8. The system of claim 1, wherein the one or more stored parameters associated with the building property comprises one of a premium, a discount, and a surcharge to be applied to a risk policy for the building property.

9. A system comprising:
a communications interface device for transmitting and receiving data from an electronic control center networked with a plurality of sensors for detecting one or more conditions associated with one or more building regions of a building property, said data related to electronic signals generated by one or more of the plurality of sensors corresponding to one or more sensed conditions of the one or more building regions;
a data storage device configured to store sensor data; and
a server communicatively coupled to the communications interface device and the data storage device and configured to:
receive, via the communications interface device, from the electronic control center, the data related to the electronic signals corresponding to the one or more sensed conditions of the one or more building regions;
determine whether the data related to the electronic signals indicates a presence of a risk condition corresponding to the one or more building regions;
responsive to a determination that the data related to the electronic signals indicates the presence of the risk condition, transmit, via the communications interface device to the electronic control center, instructions for controlling one or more of a plurality of electronic and electromechanical devices to mitigate the risk condition;
receive, via the communications interface device from the electronic control center after implementation of the instructions, additional data relating to additional electronic signals corresponding to the one or more sensed conditions of the one or more building regions; and
determine, based upon the additional data, whether the risk condition was mitigated by the implementation of the instructions; and responsive to a determination that the risk condition was not mitigated by the implementation of the instructions, modify one or more stored parameters associated with the building property.

10. The system of claim 9, wherein the risk condition comprises one of a water risk, a fire risk, and a wind risk.

11. The system of claim 9, wherein the one or more of the plurality of sensors comprises one or more of a smoke detector, a fire detector, and a visual flame imaging sensor, wherein the risk condition comprises a potential fire, wherein the one or more of the plurality of electronic and electromechanical devices comprises a fire alarm, and wherein the instructions to control the one or more of the plurality of electronic and electromechanical devices to mitigate the risk condition comprises an instruction to control the fire alarm to initiate an alarm.

12. The system of claim 9, wherein the one or more of the plurality of sensors comprises a temperature sensor, wherein the risk condition comprises an open window detected based on temperature data sensed by the temperature sensor, wherein the one or more of the plurality of electronic and electromechanical devices comprises a window motor, and wherein the instructions to control the one or more of the plurality of electronic and electromechanical devices to mitigate the risk condition comprises an instruction to control the window motor to close the open window.

13. The system of claim 9, wherein the electronic control center is further configured to continually receive the additional electronic signals from the plurality of sensors and transmit the additional data relating to the additional electronic signals to the server via the communications interface device, and wherein the server is further configured to determine a usage of one of the plurality of sensors based upon the additional data and modify the one or more stored parameters associated with the building property based upon the determined usage.

14. The system of claim 9, wherein the server is further configured to receive auxiliary data indicative of current enrollment in monitoring services provided by one or more third party monitoring services currently monitoring one or more of the plurality of sensors, and wherein the server is further configured to modify the one or more stored parameters associated with the building property based upon the auxiliary data.

15. The system of claim 9, wherein the server is further configured to determine, responsive to the data related to the electronic signals indicating the risk condition corresponding to the one or more building regions, whether a first notice of loss has occurred.

16. The system of claim 9, wherein the data storage device is further configured to store historical and comparative sensor data, and wherein the server being configured to determine whether the data related to the electronic signals indicates the presence of the risk condition corresponding to the one or more building regions is based upon analysis of the data related to the electronic signals based upon the historical and comparative sensor data.

\* \* \* \* \*